United States Patent [19]

Kramer

[11] 4,197,959

[45] Apr. 15, 1980

[54] COVERS FOR ELECTRICAL RECEPTACLES

[75] Inventor: David E. Kramer, Northbrook, Ill.

[73] Assignee: Daniel Woodhead, Inc., Northbrook, Ill.

[21] Appl. No.: 915,400

[22] Filed: Jun. 14, 1978

[51] Int. Cl.² .............................................. H02G 3/14
[52] U.S. Cl. ..................................... 220/242; 220/3.8; 174/67; 339/44 R; 339/44 M
[58] Field of Search ................ 220/3.8, 241, 242, 334; 174/53, 66, 67; 339/44 R, 44 M

[56] References Cited

U.S. PATENT DOCUMENTS

| | | | |
|---|---|---|---|
| 3,137,407 | 6/1964 | Macklewicz | 220/242 |
| 4,036,396 | 7/1977 | Kennedy et al. | 220/242 |
| 4,058,358 | 11/1977 | Carlisle | 339/44 M |
| 4,138,187 | 2/1979 | Brygger | 339/44 R |

*Primary Examiner*—George T. Hall
*Attorney, Agent, or Firm*—Emrich, Root, O'Keeffe & Lee

[57] ABSTRACT

A cover for electrical receptacles having a passageway therethrough for receiving such a receptacle, and having a pivotally mounted closure member spring urged toward overlying closed position relative to the passageway; a flexible flange extending around the passageway for sealingly engaging the cover when the latter is in closed position.

4 Claims, 3 Drawing Figures

COVERS FOR ELECTRICAL RECEPTACLES

BACKGROUND OF THE INVENTION

This invention relates to covers for electrical receptacles, and, more particularly, covers for electrical receptacles which are of the "weatherproof" or "waterproof" type.

It is a primary object of the present invention to afford a novel cover for electrical receptacles.

Another object of the present invention is to afford a novel cover for electrical receptacles which is particularly well adapted for outdoor use and for use around marinas, and the like, the cover affording effective protection against the weather and against the entry of water therethrough.

Covers for electrical receptacles which are intended to afford protection against the weather, and for protection against the entry of water therethrough have been heretofore known in the art. However, covers of this type which have been heretofore known in the art have had several inherent disadvantages, such as, for example, not being readily opened and closed; not affording effective protection when an electric plug, or the like, is inserted therein; not being of a type which will automatically close when an electric plug is disconnected from the receptacle mounted thereon or therein; requiring a manual operation for closing the cover; or being complicated in construction and operation and difficult and expensive to manufacture, or the like. It is an important object of the present invention to overcome such disadvantages.

Another object of the present invention is to afford a novel cover of the aforementioned type, which embodies a spring-actuated door or lid for opening and closing the same, and which door or lid is normally, yieldingly, spring-held in closed position.

Another object of the present invention is to afford a novel cover of the aforementioned type wherein, when the door is in closed position, it is disposed in effective sealing engagement with a sealing element, so as to insure that water will not enter through the cover into the receptacle.

Another object of the present invention is to afford a novel cover of the aforementioned type which is practical and efficient in operation and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired to those skilled in the art without departing from the present invention and the purview of the appended claims.

DESCRIPTION OF THE EMBODIMENT SHOWN HEREIN

Figure 1:
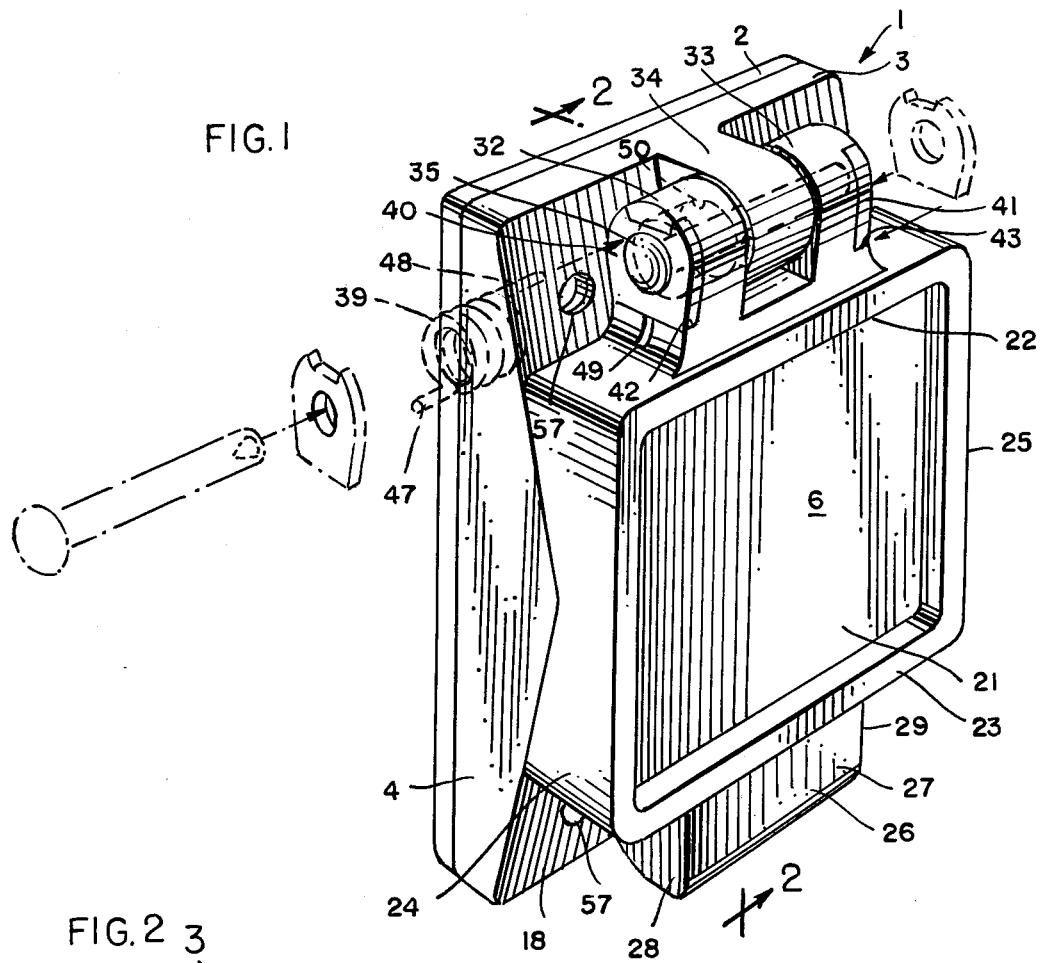
FIG. 1 is a front perspective view of a cover for an electrical receptacle embodying the principles of the present invention.

A cover 1 for an electrical receptacle is shown in the drawings to illustrate the presently preferred embodiment of the present invention.

Figure 2:
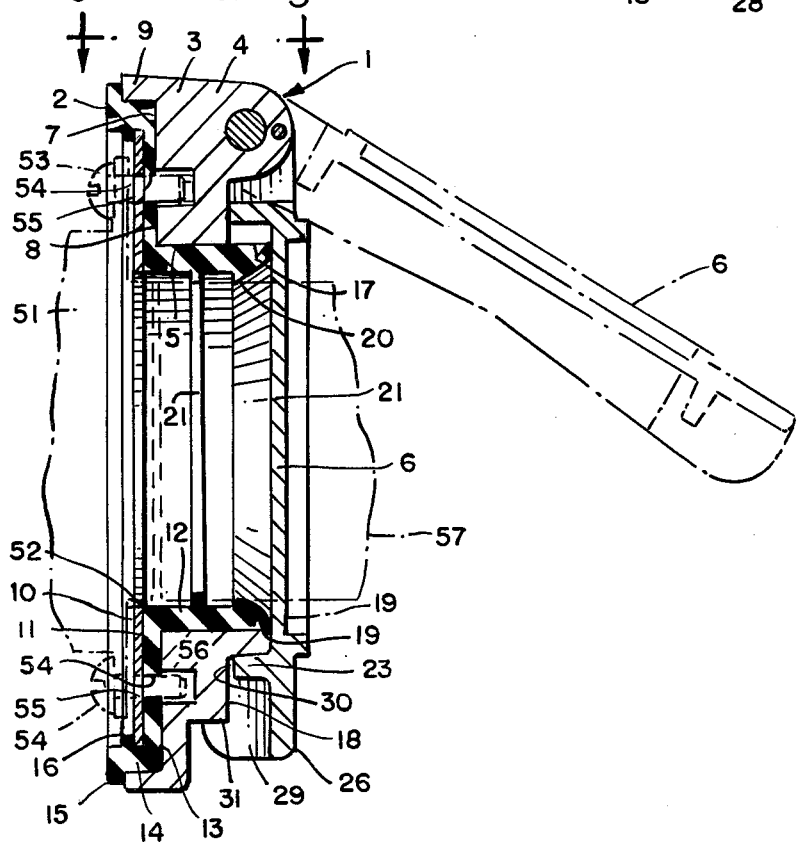
FIG. 2 is a longitudinal sectional view taken substantially along the line 2—2 in FIG. 1.
Figure 3:
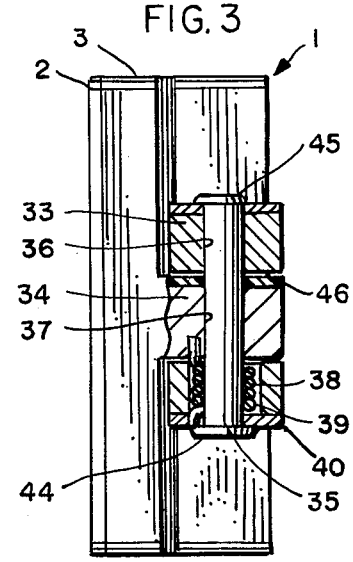
FIG. 3 is a top plan view, looking in the direction of the arrows 3—3 in FIG. 2, with certain parts broken away to show underlying parts.

The cover 1 embodies a base 2 and a housing 3, FIGS. 1-3. In the assembled cover 1, the base 2 is releasably mounted on the rear face of the housing 3, FIG. 2, as will be discussed in greater detail presently.

The housing 3 embodies a substantially rectangular-shaped supporting frame 4 having an opening 5, which is round in transverse cross section, extending laterally through the center thereof, from front to rear, and embodies a closure member in the form of a lid or door 6 pivotally mounted on the frame 4 for swinging movement between a closed position, such as shown in solid lines in FIG. 2, and an open position, such as shown in broken lines in FIG. 2. The frame 4 and the door 6 may be made of any suitable material, but, preferably, are made from a suitable wear-resistant, water-repellant, electrical-insulating plastic material, such as, for example, glass-filled polyester.

The supporting frame 4 of the housing 3 embodies a substantially rectangular-shaped concavity 7 disposed in the rear face thereof in surrounding relation to the opening 5. The front of the concavity 7 is defined by a rear face 8 of the supporting frame 4, and the outer peripheral edge of the concavity 7 is defined by a lip 9 projecting rearwardly from the face 8 and extending around the outer periphery of the supporting frame 4.

The base 2 embodies a plate 10 and a resilient gasket 11, with the plate 10 mounted in the gasket 11, as will be discussed in greater detail presently. The plate 10 may be made of any suitable material, but, preferably, is made of stainless steel. Likewise, the gasket 11 may be made of any suitable material, but, preferably, is made of relatively soft, resilient rubber.

The gasket 11 embodies a cylindrical-shaped body portion 12, from the rear end of which an annular, substantially rectangular-shaped flange 13 projects radially outwardly, FIG. 2. A cylindrical flange 14 projects rearwardly from the peripheral edge of the annular flange 13, and terminates at its rear end portion in a radially outwardly projecting annular lip 15. The flange 14 of the gasket 11 has a groove or recess 16 formed in and extending around the interior thereof, and in the assembled base 2, the plate 10 is disposed in the groove 16, with the flange 14 disposed in covering, snugly-engaging relation to the outer periphery of the plate 10.

The body portion 12 of the gasket 11 preferably is complementary in transverse, cross sectional size and shape to the opening 5 in the supporting frame 4, and in the assembled cover 1, the body portion 12 is disposed in the opening 5 with a snug, but freely slidable, frictional fit. In this position of the gasket 11, the flange 13 is disposed in abutting engagement with the rear face 8 of the concavity 7 in the supporting frame 4, and the outer periphery of the flange 14 of the gasket 11 is disposed in snugly engaging relation to the inner face of the lip 9 on the supporting frame 4, with the lip 15 on the gasket 11 disposed in abutting engagement with the rear end of the lip 9, FIG. 2.

The body portion 12 of the gasket 11 is of such length that, when the gasket 11 is disposed in operative position in the housing 3, as shown in FIG. 2, the front end portion 17 thereof projects forwardly from the supporting frame 14 a sufficient distance that when the door 6 is disposed in closed position, as shown in solid lines in FIG. 2, the front end portion 17 of the gasket 11 is disposed in yielding, abutting engagement therewith. In the preferred form of the cover 1, the front end of the front end portion 17 is defined by a relatively narrow, annular lip 19. The front end portion 17 of the gasket 11 slopes inwardly from the lip 19 to define a shoulder 20, and in its normal, uncompressed position, the lip 19 flairs radially outwardly, in a forward direction from the shoulder 20, as shown in broken lines in FIG. 2. When the door 6 is disposed in closed position relative to the supporting frame 4, the lip 19 is deflected outwardly and rearwardly thereby into the compressed position shown in solid lines in FIG. 2. Thus, it will be seen, that when the door 6 is disposed in closed position on the housing 3, the opening through the gasket 11 and the opening 5 through the housing 3 is effectively sealed at the front end portion thereof by the engagement of the door 6 with the lip 19.

In the preferred form of the cover 1, the body portion 12 of the gasket 11 has a radially inwardly, annular rib 21 formed therein substantially midway between the shoulder 20 and the annular flange 13 on the rear end portion of the body portion 12. The shoulder 20 and the rib 21 are of a type heretofore known in the art, and preferably are of such internal size that they will sealingly engage the external surface of an electric plug, of the proper size, inserted into the body portion 12 of the gasket 11 from the front of the cover 1, as will be discussed in greater detail presently.

The lid or door 6 of the housing 3 embodies a front wall 21a, from which rearwardly project a top wall 22, a bottom wall 23 and two oppositely disposed side walls 24 and 25, respectively. A handle 26 projects downwardly from the bottom face of the bottom wall 23 of the door 6. The handle 26 embodies a front wall 27 and two rearwardly projecting side walls 28 and 29. The rear edges of the side walls 28 and 29 terminate in uniplaner relation to the lower rear edge portions of the side walls 24 and 25 of the door 6. The handle 26 is open at the bottom, and the front wall 27 thereof is spaced forwardly from the front wall 18 of the supporting frame 4, when the door 6 is in the aforementioned closed position, so that a person, by inserting his fingers upwardly into the handle 26 may manipulate the door 6 between the open and closed positions shown in broken lines and solid lines, respectively, in FIG. 2.

The bottom wall 23 of the door 6 has a slot or recess 30, FIG. 2, formed in the central portion thereof, and a boss 31 projects forwardly from the lower central portion of the front face of the front wall 18 of the supporting frame 4 in position to be disposed in the slot 30 when the door 6 is disposed in closed position, as shown in solid lines in FIG. 2. The slot 30 and the boss 31 preferably are of such lateral width that, when the boss 31 is so disposed in the slot 30 it is effective to substantially completely close the slot 30.

The door 6 has two ears 32 and 33 projecting upwardly from the top face of the top wall 22 thereof in substantially parallel, spaced relation to each other, FIG. 1. In the assembled cover 1, a boss 34 which projects forwardly from the upper portion of the front face 18 of the supporting frame 4 is disposed between the ears 32 and 33, and the latter are pivotally connected thereto by a suitable fastening member, such as rivet 35 extending through the ears 32 and 33 and the boss 34, FIGS. 1 and 3. The opening 36 through the ear 33 and the opening 37 through the boss 34, through which the rivet 35 is inserted in assembling the door 6 on the supporting frame 4, preferably are of such size that in the assembled cover 1, the rivet 35 is engaged therein with a relatively snug, but freely slidable fit. The opening 38 in the ear 32, through which the rivet 35 is so inserted, is of substantially greater cross sectional size than that of the rivet 35, so as to accommodate a torsion spring 39.

In the assembled cover 1, two hinge plates 40 and 41 are mounted in notches 42 and 43 in the outer, lateral surfaces of the ears 32 and 33, respectively, in surrounding relation to the rivet 35 and afford effective, protective bearing surfaces for engagement by the head 44 and the crimp 45 on the rivet 35, FIG. 3. In the preferred form of the cover 1 shown in the drawings, a washer or spacer 46, made of suitable material such as, for example, a suitable plastic such as nylon, is mounted around the rivet 35 between the ear 33 and the adjacent face of the boss 34 to afford a low-friction bearing surface between the ear 33 and the boss 34 so that, with the torsion spring 39 yieldingly urging the ear 33 toward the boss 34 movement of the door 6 between open and closed position may be readily accomplished.

As is common in torsion springs, the torsion spring 39 has two prongs 47 and 48 projecting outwardly from opposite ends thereof, FIG. 1. A notch 49 is formed in the intermediate portion of the upper face of the bottom portion of the recess 42, and an opening 50 is formed in the side face of the boss 44, which faces toward the ear 32 in the assembled cover 1, to operatively receive the prongs 47 and 48, respectively. With this construction, when the door 6 is moved forwardly and upwardly from the closed position shown in solid lines in FIG. 2, toward an open position, such as shown in broken lines in FIG. 2, the prong 48 is held stationary by its engagement in the opening 50 in the boss 34, and the prong 47 is rotated in a counter-clockwise direction relative thereto, so that the spring 39 is effective to yieldingly urge the door 6 to move back toward closed position. The spring 39 is pre-tensioned so that, in the closed position of the door 6, the latter is yieldingly held in such position in the aforementioned yielding, abutting engagement with the lip 19 on the front end portion 17 of the gasket 11.

In the use of the cover 1, a suitable electrical connector, such as a receptacle 51 may be mounted on the rear of the cover 1 in abutting engagement with the plate 10, with the front central portion of the connector 51 extending forwardly through an opening 52 in the plate 10 into the rear end portion of the body portion 12 of the gasket 11, and may be secured in such position to the cover 1 by suitable fastening means, such as screws or bolts 53 and 54 shown in broken lines in FIG. 2, extending through openings 54 and 55 in the upper and lower end portions of the plate 10 and the flange 13, and threaded into openings 56 formed in the upper and lower end portions of the supporting frame 4, FIG. 2. With the connector 51 thus mounted on the cover 1, the latter may be mounted on a suitable supporting member, such as, for example, a junction box, or the like, not shown, and secured thereto by suitable means such as bolts or screws, not shown, extending through openings 57 in the base 2 and supporting frame 3 of the cover 2. As will be appreciated by those skilled in the art, in such use of the cover 1, the connector 51 will be connected to a suitable source of electric power.

When the connector 51 is not being used as a source of electric current, the cover 6 is effectively, yieldingly held by the torsion spring 39 in the closed position shown in solid lines in FIG. 2, wherein it is sealingly engaged with the lip 19 on the gasket 11 in a manner to be effective to prevent water, or the like, from entering through the front of the cover 1 and engaging the connector 51.

When it is desired to connect an electric plug to the connector 51, the operator may manually grasp the handle 26 and swing the door 6 upwardly from its closed position, shown in solid lines in FIG. 2, to a more fully open position than the open position shown in broken lines in FIG. 6, and a plug, such as the plug 58, shown in FIG. 2, may be inserted through the front end of the gasket 11 into operative connection with the connector 51. Preferably, the connector thus inserted into the cover 1 is of such external size and shape that it is disposed in firm, frictional engagement with the shoulder 20 and the rib 21 in the body portion 12 of the gasket 11. When so connected, the connection between the gasket 11 and the plug, such as the plug 58, is effective to prevent the passage of water, or the like, into the cover 1 from the front thereof a sufficient distance to reach the connection between the plug 58 and the connector 51. However, even when the plug 57 is of such smaller size, or of such configuration that it does not effectively make sealing engagement with the shoulder 20 and the internal rib 21, the construction of the cover 1 is such that it affords effective protection against the entry of water inwardly through the front thereof into contact with the connnection between the plug 58 and the connector 51, the cover 6 overlying the front opening in the cover 1 so as to protect the same against rain; the plug 58, even though spaced from the shoulder 20 and the rib 21 affording an obstruction to the entry of such water, or the like; and the outwardly flairing front portion 17 of the body portion 12 and the inwardly projecting rib 21 affording an internal construction in the body portion 12 of the gasket 11 which inhibits inward flow of water through the gasket 11.

When it is desired to disconnect the plug 58 from the connector 51 and return the cover 1 to its normal condition, this may be readily accomplished by merely withdrawing the plug 58 from the cover 1 and permitting the door 6 to again be moved into the closed position shown in solid lines in FIG. 2 by the action of the torsion spring 39 thereon.

From the foregoing it will be seen that the present invention affords a novel closure 1 for electrical receptacles, and the like, which affords effective protection against the entry of water therethrough when the cover is in either closed or open position.

Also, it will be seen that the present invention affords a novel cover for electrical receptacles which may be quickly and easily operated even by unskilled persons.

In addition, it will be seen that the present invention affords a novel cover for electrical receptacles which is practical and efficient in operation and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. A cover for an electrical receptacle comprising
   a. a base
      (1) having a rear face adapted to be abuttingly engaged with a supporting member, and
      (2) including a resilient, substantially cylindrical-shaped body portion projecting axially, forwardly from said rear face,
   b. said body portion having a rear end portion adapted to receive a front portion of such a receptacle therein,
   c. said base having an opening therein in axial alignment with said body portion in position to permit insertion of said front portion of such a receptacle forwardly through said opening into said rear end portion of said body portion, and including
      (1) a plate disposed rearwardly of said body portion, and
      (2) a resilient, integral extension of said body portion enveloping the outer peripheral edge of said plate,
   d. a housing mounted on said base in surrounding relation to said body portion,
   e. said body portion having a front end portion for the insertion of an electrical plug therethrough into electrical connection with such a receptacle having the front end portion thereof so disposed in said rear end portion of said body portion,
   f. said housing including a closure member movable into and out of covering relation to said front end portion of said body portion,
   g. said body portion having annular, inwardly projecting means therein for yieldingly engaging the outer peripheral surface of such a plug when said plug is mounted in said body portion in electrical connection with such a receptacle
   h. said annular inwardly projecting means comprising
      (1) an annular, inwardly projecting shoulder in said front end portion of said body portion, and
      (2) an annular inwardly projecting shoulder disposed between and spaced from said first mentioned shoulder and said rear end portion of said body portion.
2. A cover as defined in claim 1, and in which
   a. said housing includes a concave-rearwardly supporting frame,
   b. said frame has an opening therethrough, and
   c. said base is mounted in said frame with
      (1) said plate disposed in the rear portion of said frame, and
      (2) said body portion projecting through said opening in said frame into position wherein said front end portion of said body portion is disposed in forwardly projecting relation to said frame.
3. A cover as defined in claim 2, and in which
   a. said closure member is pivotally mounted on said frame for swinging movement between
      (1) a closed position wherein it is disposed in overlying, abutting, covering engagement with said front end portion of said body portion, and
      (2) an open position wherein it is disposed in outwardly projecting uncovering relation to said front end portion of said body portion in position to free the latter for insertion of such a plug thereinto.
4. A cover as defined in claim 2, and in which a. said frame includes a boss projecting forwardly from the front thereof,
b. said closure member includes two ears disposed on respective opposite sides of said boss,
c. said ears are pivotally connected to said boss for swinging movement relative to the latter into and out of said covering relation to said front end portion of said body portion.

* * * * *

UNITED STATES PATENT AND TRADEMARK OFFICE
CERTIFICATE OF CORRECTION

PATENT NO. : 4,197,959
DATED : April 15, 1980
INVENTOR(S) : David E. Kramer

It is certified that error appears in the above-identified patent and that said Letters Patent are hereby corrected as shown below:

Column 5, line 28: change "57" to --58--.

Signed and Sealed this

Twenty-fourth Day of June 1980

[SEAL]

Attest:

SIDNEY A. DIAMOND

Attesting Officer

Commissioner of Patents and Trademarks